A. H. NEULAND.
INDUCTION POWER TRANSMITTING DEVICE.
APPLICATION FILED APR. 16, 1914.
1,223,095.
Patented Apr. 17, 1917.
2 SHEETS—SHEET 1.
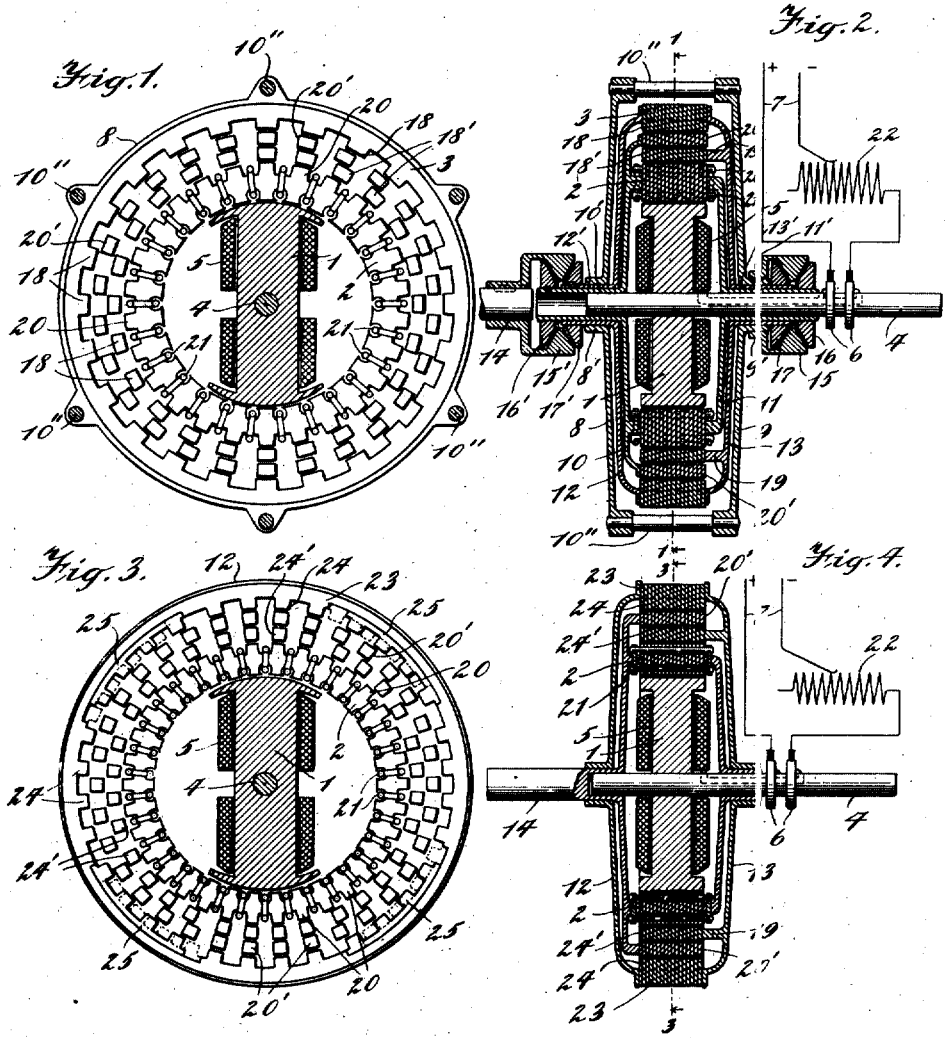
WITNESSES:
INVENTOR.
Alfons H. Neuland
BY
Rosenbaum, Stockbridge & Borst
ATTORNEYS.

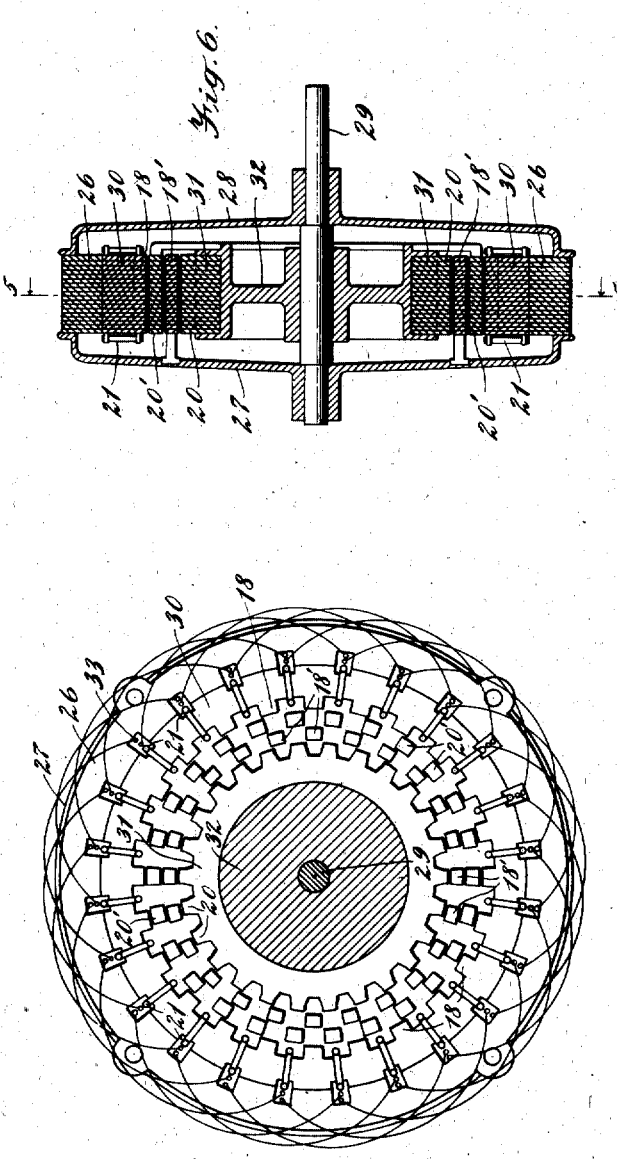

UNITED STATES PATENT OFFICE.

ALFONS H. NEULAND, OF BERGENFIELD, NEW JERSEY.

INDUCTION POWER-TRANSMITTING DEVICE.

1,223,095.   Specification of Letters Patent.   Patented Apr. 17, 1917.

Application filed April 16, 1914. Serial No. 132,195.

*To all whom it may concern:*

Be it known that I, ALFONS H. NEULAND, a subject of the Czar of Russia, residing at Bergenfield, in the county of Bergen and State of New Jersey, have invented certain new and useful Improvements in Induction Power-Transmitting Devices, of which the following is a full, clear, and exact description.

My invention relates to power transmitting devices and particularly to such devices of the electromagnetic or induction type, being adapted to transmit power from one rotating member to another, as from one shaft to another.

An object of my invention is to provide such a device which will be simple, powerful, and efficient, and which will produce a change in angular velocity between the driving and driven members.

Another object is to provide means for varying the speed of the driven member without stopping the driver. Another object is to provide means for reversing the direction of rotation of the driven member. Still other objects and advantages of my invention will appear from the following description.

In accordance with my invention, I provide means for producing a revolving magnetic flux traversing and coupling a co-axial stator and rotor, the rotor and magnetic flux having a synchronous ratio of rotation at which they rotate at different angular speeds, and I provide an induction winding within the magnetic field, either on the rotor or stator, which is so arranged that it is not cut by the revolving flux except when the revolving flux and the rotor are out of synchronism, under which condition a current is induced in the winding and a torque is developed in the rotor dependent on the amount of slip.

To effect a difference in angular speed between the field and rotor when they are in electrical synchronism, in the preferred form the rotor and stator are each provided with a plurality of spaced magnetic conductors arranged so that those on the rotor will successively radially aline with those on the stator as the rotor rotates, the relative angular speed of the rotor and field being determined by the number of magnetic conductors on the rotor and by the number of circumferential points of alinement of the magnetic conductors, which corresponds to the number of poles of the rotating field.

My invention also comprehends means for reversing the direction of rotation of the driven member, which is preferably done either by providing for reversible connections so that either element may be used as the rotor and either as the stator, or by making certain of the magnetic conductors shiftable circumferentially on one of the members, thereby reversing the direction of the torque.

My invention also comprehends means for regulating the speed of the driven member. In the preferred form, the revolving magnetic field is produced by a rotating electromagnet mounted co-axially within the stator and rotor, and the speed control may be obtained by varying the magnetizing current or in any other suitable way, as will readily occur to those skilled in the art.

My invention also comprehends various other features of construction and arrangements and combinations of parts, as will hereinafter more fully appear.

I shall now describe the embodiments of my invention illustrated in the accompanying drawings, and shall thereafter point out my invention in claims.

Figure 1 is a transverse vertical section of a machine embodying my invention, taken on the line 1—1 of Fig. 2;

Fig. 2 is a central longitudinal vertical section of the same;

Figs. 3 and 4 are corresponding views of a modified embodiment of my invention; and Figs. 5 and 6 are corresponding views of another embodiment of my invention.

In the machine illustrated in Figs. 1 and 2, the revolving field is produced by a rotative field member 1, mounted co-axially within the annular laminated concentric soft iron members 2 and 3, which may be interchangeably used as the rotor and stator, respectively, as will presently appear. The field member 1 is fixed upon a central longitudinal axis 4 and is shown as bipolar, being provided with a suitable field winding 5, the leads to which enter through a longitudinal bore or slot in the axis 4, as indicated in dotted lines, and connect to collector rings 6, which are engaged by the brushes of the external or magnetizing circuit 7 in the usual manner.

The machine has a stationary frame or housing comprising two side plates 8 and 9 secured together by a series of bolts 10″ around their peripheries which are shouldered to properly space the side plates, and similarly the members 2 and 3 are secured between the peripheries of side plates, the side plates 10 and 11 of the member 2 being contained within the side plates 12 and 13 of the member 3. The stationary side plates 8 and 9 of the housing are provided with central hub portions 8′ and 9′, respectively, and within the hub 8′ bear concentric hub portions 10′ and 12′ of the side plates 10 and 12, respectively, and within the hub 9′ bear concentric hub portions 11′ and 13′ of the side plates 11 and 13, respectively. The axis 4 bears within the inner hubs 10′ and 11′, and thus the rotary members have concentric bearings within the stationary hubs of the housing.

When one of the members 2 and 3 is fixed or stationary, the rotation of the field member will cause the other member to rotate upon its axis, as will be hereinafter described, and the relative direction of rotation of the two members is opposite to each other. In order to reverse the direction of rotation of the driven shaft 14, therefore, clutches are provided for clutching either of the two members at will to the stationary housing, and either to the driven shaft 14. As shown, there is slidably keyed upon the stationary hub 9′ a shiftable clutch member 15 which may be moved into engagement with either the clutch element 16 on the hub 11′ of the member 2, or with the clutch element 17 on the hub 13′ of the member 3. It is apparent that if the clutch member 15 engages the clutch element 16, the member 2 will be held stationary and the member 3 will be free to rotate, and similarly if the clutch member 15 engages the clutch element 17, the member 3 will be held stationary and the member 2 will be free to rotate.

A similar clutch mechanism is provided between the driven shaft 14 and the hubs on the opposite side of the machine. A clutch member 15′ is slidably keyed on the driven shaft 14 and is adapted to engage either the clutch element 16′ on the hub 10′ or the clutch element 17′ on the hub 12′, and it is therefore apparent that the driven shaft may be thereby clutched to whichever of the two members 2 or 3 is caused to rotate. The device will be described with the member 3 as the stator and the member 2 as the rotor, in which position the clutch member 15 is in engagement with the clutch element 17, and the clutch member 15′ is in engagement with the clutch element 16′, or in other words, both clutch members will be shifted to the left, it being understood that this connection may be readily reversed which will result in reversing the direction of rotation of the driven shaft.

The inner periphery of the outer member 3, which I shall now term the stator, is provided with a plurality of equally spaced longitudinally extending teeth 18, shown as twenty-four in number, and internally of these teeth and spaced somewhat from their inner ends is a series of twenty-four laminated soft iron bars 18′, arranged concentric with the inner ends of the teeth 18 and supported upon an annular rib 19 on the side plate 13, the bars 19 being disposed parallel to and in radial alinement with the respective teeth 18.

The member 2, which I shall now call the rotor, is provided on its outer periphery with a series of equally spaced longitudinally-extending teeth 20 differing in number from those on the stator and shown as twenty-six in number, there being only a slight air gap space between the outer ends of the teeth 20 and on the inner faces of the bars 18′, and disposed within the space between the teeth 18 and the bars 18′ is a series of twenty-six laminated soft iron bars 20′, which are carried by an extension of the side plate 10 of the rotor and are arranged in radial alinement with and parallel to the respective teeth 20. The rotor and stator bars are of substantially the same width as the teeth of the respective members, and their thickness is such that when they are alined they reduce the air gap between the stator and rotor to a minimum, while it will be observed that when they are in staggered relation, they substantially break the magnetic path between the two members.

The rotor teeth and bars differ in number from those of the stator by the number of poles of the field member 1, and it will therefore readily be seen that there are two points of full alinement of the rotor and stator teeth and bars. It is evident that with the illustrated construction, the rotation of the rotor with respect to the stator for a distance equal to the pitch of the rotor bars and teeth, will cause the teeth and the bars of the rotor to aline themselves successively with the teeth and bars of the stator, thus causing the circumferential progression of the magnetic path formed by the alinement of the teeth, for one-half of a revolution. The field member has the same angular speed as the revolving magnetic path when the field member is in electrical synchronism with the rotor, the field and rotor rotating in the same direction since the number of teeth and bars of the rotor exceeds that of the stator. In other words, the relative angular velocity between the field member and the rotor is as 13 to 1, the magnetic paths making 13 complete revolutions to each rotation of the rotor, and the ratio of rotation between the field member and rotor when they rotate in electrical synchronism is therefore 13 to 1.

It will be observed that in addition to the magnetic path just described, which includes the alined teeth and bars across the air gap between the stator and rotor, the rotor also forms a closed magnetic path which is shorter than the path through the alined teeth and bars and through the stator, and the flux will therefore tend to pass through the rotor, one half in one direction and the other half in the other direction. The flux will take this shorter path when the field member is standing still, since the magnetizing current is a direct current, irrespective of whether or not there are induction coils upon the rotor. When the field member is rotated, however, the flux becomes an alternating one, and it is evident that under that condition an induction coil upon the rotor will tend to choke back the magnetic flux through the rotor and to cause the flux to follow the other path through the alined teeth and bars and through the stator. An induction winding is therefore placed in the construction shown upon the rotor, and this winding is composed of twenty-six short-circuited turns 21, disposed between the respective rotor teeth 20, and each turn being independent of the others and being composed of an external bar laid in between the teeth and an internal bar disposed in a slot provided for the purpose, and two bars on opposite sides of the rotor connecting the ends of the external and internal bars.

When the driver and driven members rotate in synchronism, which condition can only be brought about by driving the driven member externally, the driven member develops no torque. This is due to the fact that if the rotor or driven member be rotated by external means in synchronism with the revolving magnetic field, the revolving field travels at the same velocity as the revolving magnetic path and the axial line of the field member therefore maintains alinement with the progressing magnetic path between the rotor and the stator, and the alternating magnetix flux, which is caused to seek the longer path by the induction winding of the rotor, will pass between the short-circuited turns of the induction winding without cutting them and without inducing a current therein.

Under that condition, however, as previously stated, the driven member or rotor will develop no torque, and it will be seen that the rotor will develop a torque only when it is out of synchronism with the revolving field. This is the condition which always obtains in actual operation. As the field member is rotated and the alternating magnetic flux is thereby produced, the flux will necessarily pass around the rotor cutting the induction coils 21, in order to reach the alined teeth and bars, at all times except at the instant when the axial line of the field member is in alinement with the alined teeth and bars. As the alternating flux is thus caused to cut the short-circuited turns of the induction winding, it induces a current therein and produces a torque in the rotor.

This slip from synchronism will increase substantially in proportion to the load upon the rotor, and it will therefore be seen that the torque increases with the increase in load. It is manifest that the frequency of alternations of the flux through the short-circuited turns and hence the E. M. F. induced therein, is in direct proportion to the slip of the rotor from synchronism, while the strength of the current in the coils is proportional to the E. M. F. and therefore proportional to the slip from synchronism, and, furthermore, since the power of the inductive couple is dependent upon the strength of the current, it is evident that the greater the load on the rotor and the consequent slip, the greater the frequency and strength of the induced current, and hence proportionally greater within certain limits the torque of the rotor.

The speed of the rotor or driven member may be regulated in any suitable way, as by varying the resistance of the induction winding, or varying the exciting current, which latter may be done by including a rheostat 22 in the exciting circuit.

It is obvious that if the clutch connections are reversed, as explained above, the member 2 will be held stationary and the member 3 will then become the driven member which, however, will rotate in the opposite direction to that of the member 2. For example, as shown in Fig. 1, the member 2 will move in the same direction as the field member, while the member 3 will move in the opposite direction to effect alinement of the successive teeth and bars. If the member 3 be used as the rotor, it will be noted that the synchronous speed of the field member and the driven member will be 12 to 1, since there are twenty-four teeth on the member 3.

Thus the torque of the driven member is increased up to certain limits substantially in proportion to its slip from synchronous speed and a very powerful torque is thus developed, and it is apparent that my invention has various adaptations for reducing speed and transmitting power from one rotating member to another, and it is admirably adapted for use in connection with a high speed steam turbine to reduce its speed to a considerably lower value as required by propellers on ships, locomotives, motor-vehicles and the like. If desired, the device may also be employed to step up the speed, in which case the rotor becomes the driver and the field member becomes the driven member.

In the construction shown in Figs. 3 and 4, somewhat different means are provided for reversing the direction of rotation of the rotor. In this construction the external member 23, which corresponds to the member 3 of the construction above described, is fixed or stationary, and no external stationary housing is therefore required. The stator element 23 has thirty-two teeth 24 and bars 24' corresponding to the teeth 18 and bars 18' of Fig. 1. These bars and teeth are arranged in eight sections of four each, the teeth and bars of each section being equally spaced and the sections being alternately fixed and circumferentially adjustable or shiftable, the shiftable sections 25 being shiftable for a distance equal to one-half the pitch of the stator teeth and bars. The teeth 20 and bars 21 of the rotor, all of which are relatively immovable, are equally spaced, and consequently at two opposite points four teeth and bars of the rotor will be in alinement with those of the corresponding stator sections, as shown in Fig. 3, and the stator teeth and bars of the sections midway between the alined sections will be completely staggered or offset one-half of a tooth pitch relative to those of the rotor, and the teeth and bars of the four intermediate sections will be offset one-quarter of a tooth pitch relative to those of the rotor. Inasmuch as the direction of rotation of the rotor is determined by the intermediate stator sections, that is, the sections between the alined teeth and bars and those completely staggered, it will now be apparent that the direction of rotation of the rotor as the field member rotates will be dependent upon the relative positions of the intermediate or shiftable sections 25 of the stator teeth and bars, since in one position they are offset one-quarter of a tooth pitch in one direction relative to the rotor teeth and bars, and when moved to their other position, as shown in dotted lines in Fig. 3, which is one-half a tooth pitch from their first position, they will be offset one-quarter of a tooth pitch in the opposite direction from the rotor teeth and bars. Thus, by merely shifting the movable sections 25, the direction of rotation of the rotor will be reversed without stopping the driving member.

In the embodiment shown in Figs. 5 and 6, the revolving magnetic flux is produced in a different manner than it is in the previously described embodiments. In this embodiment, the revolving field is produced by a polyphase current, as in the ordinary induction motor, which traverses the annular laminated stator 26 which is supported between the flanged peripheries of side plates 27 and 28 having central hub-portions within which bears the central longitudinal axis 29 which carries the rotor. In the construction shown, the stator has an internal laminated separable winding-supporting portion 30, which constitutes the shorter magnetic path corresponding to the rotor 2 of Fig. 1, and which fits snugly within the stator 26, although it is apparent that the two members may be made integral. As in the construction of Fig. 1, the stator has twenty-four teeth and bars 18 and 18' and the rotor has twenty-six teeth and bars 20 and 20', the rotor teeth being formed upon an annular laminated member 31 carried upon the periphery of the hub portion 32 which is secured to the axis 29. The ratio of rotation between the revolving field and the rotor when they rotate in electrical synchronism, is, therefore, 13 to 1. The coils 21 of the induction winding are arranged around the winding-supporting portion 30 of the stator between the respective stator teeth, slots 33 being provided outside of the winding-supporting portion 30 for the accommodation of these induction coils and for the accommodation of the primary winding, there being twenty-four coils of the primary winding, or three coils per phase and pole, in the construction shown a four-phase current being preferably employed. The arrangement of the magnetizing or primary winding is indicated diagrammatically in Fig. 5, although various other well known forms of winding will readily suggest themselves to those skilled in the art.

It is now apparent that the alternating flux will tend to flow across the rotor, due to the presence of the coils 21 on the stator portion 30, and that the points of alinement of the rotor and stator teeth and bars will normally tend to follow the progressive point of maximum value of the flux caused by the progressive point of maximum current as it traverses the stator, and to remain in alinement therewith, under which condition the magnetic flux would pass directly across the path formed by the points of alinement of the teeth without cutting the induction coils 21. When, however, a load is applied to the rotor and its speed of rotation and of the progressive points of alinement is retarded relative to that of the revolving magnetic field, the magnetic flux will take its path and pass through the induction winding-supporting portion 30 of the stator circumferentially until the point of alinement is reached, and will thereby induce a current in the induction coils, and thereby cause the rotor to produce a torque, which torque, as in the constructions above described, is proportionate within certain limits to the extent of slip from synchronism.

It is obvious that various other modifications may be made in the constructions shown in the drawings and above particularly described within the principle and scope of my invention.

Having described my invention, I claim:

1. An induction power transmitting device comprising a stator, a rotor, a rotative magnetic field coupling the stator and rotor, said rotative field and said rotor when in electrical synchronism having different angular velocities, and an induction winding disposed within the magnetic field and arranged to be cut by the flux lines when the rotative field and rotor are out of synchronism.

2. An induction power transmitting device comprising a stator member, a rotor member, means for producing a revolving alternating magnetic flux adapted to couple the stator and rotor members, spaced flux conductors carried by the rotor and stator members coöperative to form a revolving path for the flux between the rotor and stator members as the rotor member rotates and one of the members including an annular magnetic path for the flux between the source of the flux and the revolving magnetic path, and an induction winding disposed around the annular path, whereby when the revolving magnetic path is out of synchronism with the rotor member the flux will flow a corresponding distance through the annular magnetic path and cut the winding and produce a torque.

3. An induction power transmitting device comprising a stator member and rotor member, spaced flux conductors carried by the rotor and stator members coöperative to form a revolving path for the flux between the rotor and stator members as the rotor member rotates having greater angular velocity than that of the rotor member, means for producing a revolving magnetic flux traversing the two members, and an induction winding disposed within the magnetic field and arranged to be cut by the flux lines when the revolving magnetic flux and magnetic path are out of synchronism.

4. An induction power transmitting device comprising a co-axially arranged stator, rotor and rotative field member, spaced flux conductors carried by the rotor and stator members coöperative to form a revolving path for the flux between the rotor member and stator members as the rotor member rotates having a greater angular velocity than that of the rotor and the field member having synchronous speed with the magnetic path, and an induction winding on one of the members arranged to be cut by the flux lines when the revolving magnetic flux and magnetic path are out of synchronism.

5. An induction power transmitting device comprising means for producing a revolving magnetic field, a stator arranged to be traversed by the magnetic field and having a plurality of circularly arranged spaced magnetic conductors extending substantially parallel to the axis of the magnetic field, a rotor having a plurality of spaced magnetic conductors adapted to successively radially aline with those of the stator and provide closed paths for the magnetic flux as the rotor rotates whereby the rotor and the magnetic field have a predetermined relative speed when in electrical synchronism, and an induction winding disposed within the magnetic field and arranged to be cut by the flux lines when the revolving magnetic field and the rotor are out of electrical synchronism.

6. An induction power transmitting device comprising a rotative magnet for producing a revolving magnetic field, a stator co-axial with the magnet and having a plurality of spaced magnetic conductors circularly disposed around the magnet and extending parallel to the axis thereof, a rotor having a plurality of spaced magnetic conductors arranged concentric with and adjacent to those of the stator and adapted to successively radially aline with those of the stator as the rotor rotates and thereby form a revolving magnetic path, whereby the rotor and the magnetic field have a predetermined relative speed when in electrical synchronism, the field and the path having the same angular velocity when the rotor and field are in electrical synchronism, and an induction winding disposed within the magnetic field and arranged to be cut by the flux lines when the revolving magnetic field and the rotor are out of electrical synchronism.

7. An induction power transmitting device comprising means for producing a revolving magnetic field, a stator arranged to be traversed by the magnetic field and having a plurality of circularly arranged spaced magnetic conductors extending substantially parallel to the axis of the magnetic field, a rotor having a plurality of spaced magnetic conductors adapted to successively radially aline with those of the stator and provide closed paths for the magnetic flux as the rotor rotates, whereby the rotor and the magnetic field have a predetermined relative speed when in electrical synchronism, and an induction winding on the rotor arranged to be cut by the flux lines when the field and rotor are out of electrical synchronism and thereby develop a torque.

8. An induction power transmitting device comprising a rotative magnet for producing a revolving magnetic field, a stator co-axial with the magnet and having a plurality of spaced magnetic conductors circularly disposed around the magnet and extending parallel to the axis thereof, a rotor having a plurality of spaced magnetic conductors arranged concentric with and adjacent to those of the stator and adapted to successively radially aline with those of the stator as the rotor rotates, and thereby form a revolving magnetic path, whereby the rotor and the magnetic field have a predetermined relative speed when in electrical synchronism, the field and the path having the same angular velocity when the rotor and field are in electrical synchronism, and an induction winding on the rotor arranged to be cut by the flux lines when the field and rotor are out of electrical synchronism and thereby develop a torque.

9. An induction power transmitting device comprising means for producing a revolving magnetic field, a stator arranged to be traversed by the magnetic field and having a plurality of circularly arranged spaced magnetic conductors extending substantially parallel to the axle of the magnetic field, a rotor having a plurality of spaced magnetic conductors adapted to successively radially aline with those of the stator and provide closed paths for the magnetic flux as the rotor rotates, whereby the rotor and the magnetic field have a predetermined relative speed when in electrical synchronism, and an induction winding on one of the members comprising a plurality of short circuited turns on the member including external and internal portions and successively disposed between the said magnetic conductors of the member.

10. An induction power transmitting device comprising a rotative magnet for producing a revolving magnetic field, a stator co-axial with the magnet and having a plurality of spaced magnetic conductors circularly disposed around the magnet and extending parallel to the axis thereof, a rotor having a plurality of spaced magnetic conductors arranged concentric with and adjacent to those of the stator and adapted to successively radially aline with those of the stator as the rotor rotates and thereby form a revolving magnetic path, whereby the rotor and the magnetic field have a predetermined relative speed when in electrical synchronism, the field and the path having the same angular velocity when the rotor and field are in electrical synchronism, and an induction winding on the rotor comprising a plurality of short circuited turns on the rotor including external and internal portions and successively disposed between the said magnetic conductors of the rotor.

11. An induction power transmitting device comprising means for producing a revolving magnetic field, a stator arranged to be traversed by the magnetic field and having a plurality of circularly arranged spaced magnetic conductors extending substantially parallel to the axis of the magnetic field; a rotor having a plurality of spaced magnetic conductors adapted to successively radially aline with those of the stator and provide closed paths for the magnetic flux as the rotor rotates, whereby the rotor and the magnetic field have a predetermined relative speed when in electrical synchronism, and means for reversing the direction of rotation of the rotor.

12. An induction power transmitting device comprising means for producing a revolving magnetic field, a stator arranged to be traversed by the magnetic field and having a plurality of circularly arranged spaced magnetic conductors extending substantially parallel to the axis of the magnetic field, a rotor having a plurality of spaced magnetic conductors adapted to successively radially aline with those of the stator and provide closed paths for the magnetic flux as the rotor rotates, whereby the rotor and the magnetic field have a predetermined relative speed when in electrical synchronism, means for reversing the direction of rotation of the rotor, and an induction winding disposed within the magnetic field and arranged to be cut by the flux lines when the revolving magnetic field and the rotor are out of synchronism.

13. An induction power transmitting device comprising means for producing a revolving magnetic field, a stator arranged to be traversed by the magnetic field and having a plurality of circularly arranged spaced magnetic conductors extending substantially parallel to the axis of the magnetic field, and a rotor having a plurality of spaced magnetic conductors adapted to successively radially aline with those of the stator and provide closed paths for the magnetic flux as the rotor rotates, whereby the rotor and the magnetic field have a predetermined relative speed when in electrical synchronism, the magnetic conductors of one member being arranged in a plurality of sections certain of which are relatively circumferentially adjustable, whereby the direction of rotation of the rotor may be reversed.

14. An induction power transmitting device comprising means for producing a revolving magnetic field, a stator arranged to be traversed by the magnetic field, and having a plurality of circularly arranged spaced magnetic conductors extending substantially parallel to the axis of the magnetic field, a rotor having a plurality of spaced magnetic conductors adapted to successively radially aline with those of the stator and provide closed paths for the magnetic flux as the rotor rotates, whereby the rotor and the magnetic field have a predetermined relative speed when in electrical synchronism, the magnetic conductors of one member being arranged in a plurality of sections certain of which are relatively circumferentially adjustable, whereby the direction of rotation of the rotor may be reversed, and an induction winding disposed within the magnetic field and arranged to be cut by the flux lines when the revolving magnetic field and the progressive path of alinement between the stator and the rotor are out of synchronism.

15. An induction power transmitting device comprising means for producing a revolving magnetic field, a stator arranged to be traversed by the magnetic field and having a plurality of circumferentially arranged spaced magnetic conductors extending substantially parallel to the axis of the magnetic field, the said magnetic conductors being arranged in sections of a similar number of equally spaced conductors and each alternate section being fixed and the intervening sections being relatively circumferentially adjustable a distance equal to one half the pitch of the magnetic conductors, a rotor having a number of equally spaced magnetic conductors arranged concentric with and adjacent to those of the stator, and the conductors of the rotor being adapted to successively radially aline with those of the successive stator sections and provide closed paths for the magnetic flux as the rotor rotates, whereby the rotor and the magnetic field have a predetermined relative speed when in electrical synchronism, the direction of rotation of the rotor being determined by the respective positions of the adjustable stator sections, and an induction winding disposed within the magnetic field and arranged to be cut by the flux lines and develop a torque when the revolving magnetic field and the rotor are out of synchronism.

16. An induction power transmitting device comprising a rotative magnet for producing a revolving magnetic field, a stator co-axial with the magnet and having a plurality of spaced magnetic conductors circularly disposed around the magnet and extending parallel to the axis thereof, a rotor having a plurality of spaced magnetic conductors arranged concentric with and adjacent to those of the stator and adapted to successively radially aline with those of the stator as the rotor rotates, whereby the rotor and the magnetic field have a predetermined relative speed when in electrical synchronism, adjustable means for regulating the speed of rotation of the rotor, and an induction winding disposed within the magnetic field and arranged to be cut by the flux lines when the revolving magnetic field and the rotor are out of synchronism.

17. An induction power transmitting device comprising a rotative magnet for producing a revolving magnetic field, a stator co-axial with the magnet and having a plurality of spaced magnetic conductors circularly disposed around the magnet and extending parallel to the axis thereof, a rotor having a plurality of spaced magnet conductors arranged concentric with and adjacent to those of the stator and adapted to successively radially aline with those of the stator as the rotor rotates, whereby the magnet and the rotor have different angular speeds when in electrical synchronism, means for reversing the direction of rotation of the rotor relative to that of the magnet, adjustable means for regulating the speed of rotation of the rotor, and an induction winding disposed within the magnetic field and arranged to be cut by the flux lines when the revolving magnetic field and the rotor are out of synchronism.

18. An induction power transmitting device comprising a rotative electro-magnet and a source of magnetizing current therefor, a stator co-axial with the magnet and having a plurality of spaced magnetic conductors circularly disposed around the magnet and extending parallel to the axis thereof, a rotor having a plurality of spaced magnetic conductors arranged concentric with and adjacent to those of the stator and adapted to successively radially aline with those of the stator as the rotor rotates, whereby the magnet and the rotor have different angular speeds when in electrical synchronism, means for varying the magnetizing current, and an induction winding on the rotor comprising a plurality of short circuited turns on the rotor including external and internal portions and successively disposed between the said magnetic conductors on the rotor.

19. An induction power transmitting device comprising a rotative electro-magnet and a source of magnetizing current therefor, a stator co-axial with the magnet and having a plurality of spaced magnetic conductors circularly disposed around the magnet and extending parallel to the axis thereof, a rotor having a plurality of spaced magnetic conductors arranged concentric with and adjacent to those of the stator and adapted to successively radially aline with those of the stator as the rotor rotates, whereby the magnet and the rotor have different angular speeds when in electrical synchronism, means for reversing the direction of rotation of the rotor relative to that of the magnet, means for varying the magnetizing current, and an induction winding on the rotor comprising a plurality of short circuited turns on the rotor including external and internal portions and successively disposed between the said magnetic conductors on the rotor.

In witness whereof, I subscribe my signature, in the presence of two witnesses.

ALFONS H. NEULAND.

Witnesses:
VICTOR D. BORST,
WALDO M. CHAPIN.